2,829,952

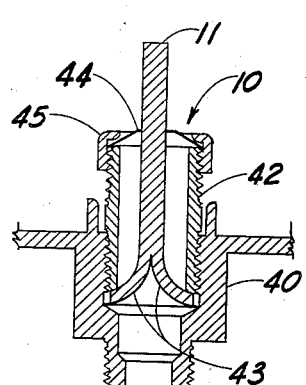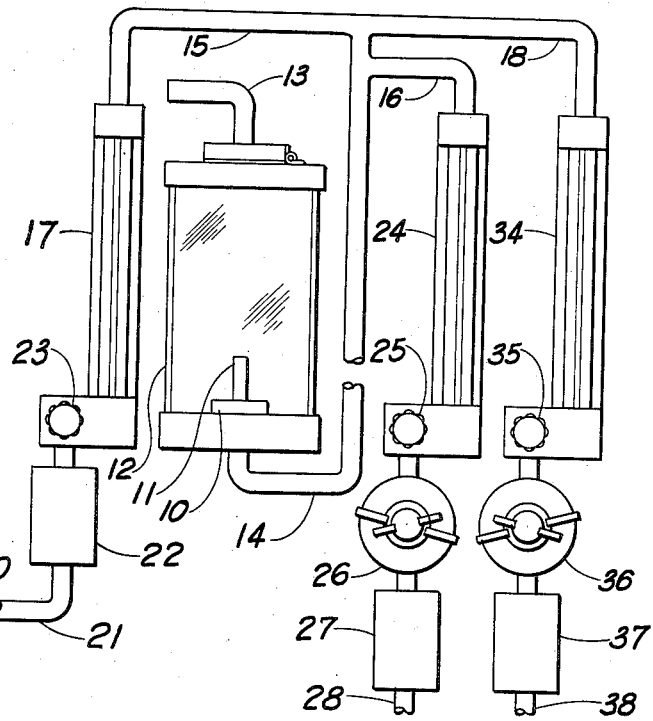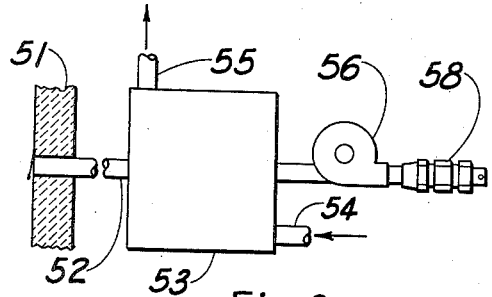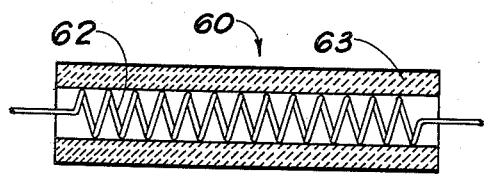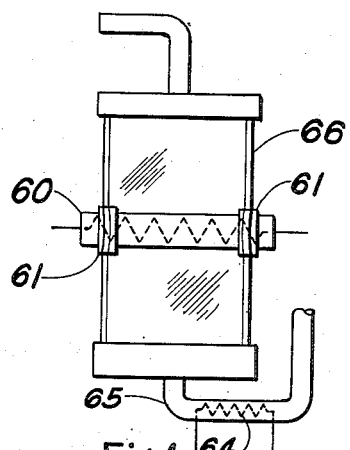

Patented Apr. 8, 1958

2,829,952
PROCESS AND APPARATUS FOR DETERMINING THE COMBUSTIBLE CHARACTER OF GASES

John J. Webber, Newark, Ohio, assignor to Owens-Corning Fiberglas Corporation, a corporation of Delaware Application October 16, 1953, Serial No. 386,579

5 Claims. (Cl. 23—232)

This invention relates to the analysis of gases and more particularly to a method and means for determining the combustible character of gases.

Difficulty is frequently experienced in the analysis of gases such as raw fuel gas, combusted gases or engine exhaust gas in that instruments of highly technical nature are required to make the measurements and a considerable period of training is required to develop skill in operators. The instruments are also usually of a delicate nature and cumbersome to operate, thus presenting an appreciable handicap to obtaining accurate readings with ease and facility.

An object of the present invention is to provide economical and easy method and means for determining the combustible character of gases.

Another object of the invention is to provide a method of determining the combustible character of gases, which method is adaptable to measurement of either raw or partially combusted gases.

Still another object of the invention is to provide an easy method of rapidly determining the combustible character of gases with apparatus capable of rugged construction.

A still further object of the invention is provision of method and means for directly determining the characteristics of gases by measurements capable of being accurately made by operators having a minimum of training.

The method and apparatus incorporating the principles of this invention involve passing a metered quantity of gas to be tested over a material which is visibly reactive to definite proportions of combustible constituents and to add to the test gas the required constituents to establish the reference condition. The amount of added matter is then used to determine the degree of variance of the test gas from a completely combustible mixture.

In describing the invention in detail, two embodiments have been chosen to illustrate the principles, each of which incorporate the use of a metal such as copper which is readily oxidized when raised in temperature. The oxidation of heated copper occurs rapidly in the presence of free oxygen, producing a dark or black film of copper oxide on the surface being heated. If, however, a deficiency of oxygen exists in the gas mixture surrounding the copper surface, it is classifiable as being of reducing nature. Such reducing gas mixtures rapidly remove the dark film of copper oxide to produce a bright, shiny copper-colored surface. In between the oxidizing and reducing gas mixture, at a point where all the free oxygen in gas is completely decomposed on combustion, the gas mixture is termed neutral. A heated copper surface surrounded by combusted gases of a neutral character produces neither a black nor a bright color on the metallic surface, but rather an intermediate color which is quite sensitive to changes toward oxidizing or reducing conditions in the gas mixture.

In accordance with the present invention, the metered quantity of gas is fed through a test burner to which either one or the other of air or raw gas may be selectably and adjustably fed, dependent on which condition the measured gas is in, to produce a neutral mixture. The adjusted test mixture is raised to the temperature of combustion and the resulting combusted gases are passed over a heated metallic surface. The quantity of either air or raw gas required to bring the sample gas to a neutral condition thereupon can be used as a measured indication of the degree of variance from neutral as well as from a condition of complete combustibility of the gas mixture being tested.

The novel features which I believe to be characteristic of my invention are set forth with particularity in the appended claims. My invention itself, however, both as to its method of operation and manner of construction together with other objects and advantages, may best be understood by reference to the accompanying drawing in which:

Figure 1 is a diagrammatic illustration of a unit incorporating the principles of the present invention showing metering components as well as the elements permitting selective connection to sources of gas to be measured;

Figure 2 is an enlarged cross-sectional view of a portion of the test burner showing the location of the metallic member to be observed for detection of a neutral gas being combusted therein;

Figure 3 is a diagrammatic illustration of the apparatus which permits the sampling of gas such as flue gas from a smoke stack for measurement in a unit incorporating the principles of this invention;

Figure 4 shows a sealed chamber unit within which flue gas conditions may be detected in accordance with the invention; and Figure 5 is an enlarged cross-sectional view showing details of construction of a metallic surface element incorporated in the unit of Figure 4.

Referring to the drawings in greater detail, Figure 1 shows the general arrangement of components of the test unit comprising a burner 10 having an associated copper bar 11 suspended within the burner opening where the flames of combustion have access to heat the bar and subject it to the gases of combustion to produce the effects of oxidation or reduction. The burner is inclosed in a glass walled chamber 12 which permits visual observation of the flame and the bar 11. The chamber 12 has a tubular outlet 13 at the top through which the products of combustion can be emitted and to which calibrating equipment such as Orsat apparatus may be attached for comparative checks of gas composition. The gases are fed to the burner through a supply tube 14 which has connected thereto a sampling line branch 15, an air supply branch 16 and a raw gas supply branch 18. The sampling branch 15, has connected in series therewith a snap-on coupling 20, a flexible hose 21, a gas filtering unit 22 and a flowrater 17 with an associated gas volume control 23. The snap-on coupling 20 is provided to enable connection with a male-connector sampling valve 19 permanently associated with burner 29 to which the gas to be measured is supplied. The air supply branch 16 has connected in series therewith a flowrater 24 with a needle-valve volume control 25, a pressure regulator 26, a gas filter 27 and an air inlet 28 while the raw gas supply branch 18 has similarly connected in series therewith a flowrater 34 with a needle-valve volume control 35, a pressure regulator 36, a filter 37 and a raw gas inlet 38.

Figure 2 illustrates in greater detail the combustion portion of the burner 10 which is threadably secured to the base 40 of chamber 12. The base 40 is arranged to threadably accommodate a nipple 42 which in being threaded into the base is arranged to tightly secure the copper bar 11 in the gas outlet. The bar 11 is provided with three finger-like members 43 which flare outwardly at one end of the bar to be clamped between the nipple 42 and the bottom of the threaded opening into which it is screwed. Thus, the bar 11 is centrally held in the opening of the nipple through which the gases to be tested are passed. The fingers 43 are spaced to permit free passage of gas with negligible retardation. Screen 44 having a snug aperture through which the bar 11 projects is provided at the upper end of the nipple where it is retained by a threadably secured annular cap member 45.

To make a test analysis of gas, the snap-on coupling 20 is connected to the valve 19 thereby automatically opening the valve to permit passage of gas to burner 10. The quantity of test gas supplied to the burner is regulated by means of volume control 23 to a predetermined rate of flow observable by means of the flowrater 17. The burner is lit by igniting it with a flame such as from a match introduced through an opening at the top of the chamber 12 which is normally closed by the hinged base of the exhaust tube 13.

After combustion is initiated, the copper bar member 11 is observed to determine whether the gas mixture being sampled is of oxidizing or reducing character. If the bar becomes dark, an excess of oxygen exists in the gas, indicating that raw gas is required to be added to the mixture to establish a condition of neutrality. The degree of oxidizing character of the gas in the main line is readily determined by measuring the rate of flow of raw gas required to be added to the given flow of sample gas supplied to the burner from the main line. That is, the needle valve 35 must be adjusted until sufficient raw gas is introduced with the sample gas to the burner 10 that the combustion therein produces a neutral color. The pressure regulators usually need not be adjusted except to obtain a setting that gives most even or stable readings on the flowraters. By precalibration of the flowrater 34, the quantity necessary to effect this neutralization at the burner can be made to indicate the degree or percent of reducing character of the tested gas and correspondingly indicate the amount of raw gas necessary to be added in the main line to effect the desired degree of combustion at the burners.

If, on the other hand, the bar 11 indicates that the sampled gas is of a reducing nature, adjustments may be made at the needle valve 25 to introduce more air to the burner to produce the desired neutral color. Correspondingly, measurement of the amount of air necessary to produce the neutral color of the bar may be used to indicate at the flowrater 24 the degree of reducing character of the mixture in the main line. Adjustments may be made accordingly to obtain the desired mixture based on the requirements for production of the reference combustion condition at the burner.

Figure 3 illustrates the manner in which the gas may be removed from a smoke stack, represented by a portion of a stack wall 51. The wall has inserted therein a sample supply tube 52 leading to a cooling unit 53 which is supplied with circulating cooling water by way of an inlet tube 54 and an outlet tube 55. The gases are drawn from the stack by means of a fan unit 56 having a pressure intensity sufficient to draw a volume of sample gas from the stack approximately equal to that provided by coupling the unit of Figure 1 to the burner 29. The sample of gas drawn by the fan 56 is supplied through the coupling-valve unit 58 which corresponds to the coupling-valve unit 19 of Figure 1. Thus, the same coupling apparatus is usable for both illustrated embodiments of the invention. That is, the unit shown in Figure 1 may be connected by its snap-on coupling 20 to the valve coupling unit 58, if desired.

Since the flue gas taken from stacks is usually of low combustible character, in many instances it would be incapable of supporting a flame as required for the unit of Figure 1. In such instances an alternative to the sensitive metal bar 11 may be used in the combustion chamber of the apparatus. A metal-coated refractory member 60 is mounted in thermal insulating seals 61 such as asbestos and held in a position within the chamber immediately above the point of inlet of gas to such chamber. Details of the member are shown in cross-section in Figure 5. The base 63 of the sensitive member 60 is tubular in form and made of silica refractory having suitable heat-shock properties. The refractory has inserted therein a heating coil 62 having leads permitting connection to an electrical power source to produce the desired heat. The surface of the refractory 63 is coated with copper applied by conventional means such as sputtering or evaporation. The coil 62 is designed to be brought up in temperature to a point where the refractory is supplied a sufficient amount of heat to cause the sensitive surface of the tube to react readily to the character of the gas being sampled. For a copper coated member, this temperature is in the order of 1500° to 1600° F.

An ignition coil 64 is located in the gas-inlet tube 65 to raise the temperature of the sample gas to that necessary to effect the combustion reaction between oxygen and uncombusted material remaining in the flue gas being sampled. The coil in some instances may be desirably replaced by an ignition system incorporating a sparking device such as a spark plug to establish the combustion reaction between oxygen and the uncombusted gas.

The sensitive member 60 is supported in the chamber 66 by thermal insulating means such as asbestos seals 61. The leads from the coil 62 extend outwardly to opposite sides of the chamber and may be readily connected to a suitable source of power (not shown) to effect the temperature rise desired.

In operation, this embodiment is similar to that of Figure 1 except that the volume being tested may be regulated both by the fan 56 as well as the volume control of the flowrater such as control 25 of the flowrater 24.

A further feature of the invention lies in the fact that it lends itself readily to automatic controls. The change in color from oxidizing to reducing occurs within a narrow range of change in gas composition. Thus, observing means such as a photoelectric cell may be provided in the vicinity of the sensitive surface and associated with valve controls so as to make changes in the main body of the test gas to bring the mixture to the desired composition. The automatic controls need not be limited to bringing the gas to be tested to a neutral value but the controls may be so interrelated with the air and other gas volume controls of the test unit so that the desired unit mixture is produced within the main body when the test unit indications or adjustments are of neutral value. That is, the automatic adjustment for the desired gas composition in the main body may be arranged to correspond to a neutral mixture in the test unit merely by causing the neutral reading to correspond to an introduction of amounts of air or raw gas which will effect the desired mixture.

In drawing the gas to be tested from a stack, it is preferred that the sample be cooled by a cooling unit such as that schematically illustrated by a block 53 having water continually flowing therethrough or as required. The gas may be lowered in temperature to a predetermined desired temperature by providing a thermocouple in the flow passage and using the signal potential to control the flow of water to the inlet 54 and outlet 55. With such an arrangement, damage to the test unit can be prevented and temperature volume relations of the gas are maintained uniform to assure consistent readings of samples.

While particular embodiments of the invention have been shown and described, modifications may be made, and it is intended in the appended claims to cover all such modifications which fall within the true spirit and scope of the invention.

I claim:

1. Apparatus for measurement of the degree of combustibility of gas mixtures comprising a gas burner, means for supplying to said burner a sample of gas mixture to be analyzed, means for adding to said sample mixture component gas as required to effect complete combustion of the sample mixture, said burner being encased in a combustion chamber, means sealing the combustion chamber against the entry of atmospheric air into the region of combustion, and viewing means in the wall of said combustion chamber to permit visual inspection of the combustion taking place within the chamber, said burner having within said chamber an associated member comprising material visibly reactive to at least one component gas of the sample to be measured providing indication when the gas mixture is being substantially completely combusted, means for regulating the flow of both the mixture and the addition of component gas, and means for determining the rates of flow of the mixture and component gas as a measure of the degree of variance of the mixture being tested from a completely combustible mixture.

2. Apparatus for measurement of the degree of combustibility of a gas at least partially combusted comprising a combustion chamber, means sealing the chamber against the entry of atmospheric air into the region of combustion, and viewing means in the wall of said chamber to permit visual inspection of the combustion taking place within the chamber, a member within said chamber comprising material visibly sensitive to oxidation and deoxidation, said member being disposed for exposure to the products of combustion within said chamber, means for supplying gas to be tested to said chamber, ignition means for promoting combustion of the test gas within said chamber, means for adding air to said test gas at an adjusted regulated rate of flow determined by observance of the color of the sensitive member, and means for determining the rates of flow of the gas and added air as a measure of the degree of variance of the gas from a completely combustible material.

3. The method of ascertaining the relative combustibility of a mixture of a combustible gas and a combustion supporting gas, comprising burning a regulated volumetric flow of the mixture, adding to the burning mixture at a regulated volumetric rate of flow a supplemental amount of the one of said gases which will establish a substantially neutral condition of combustion between an oxidizing and reducing condition, fixing the volumetric flow rate of the added gas at a value which will maintain the neutral condition of combustion, and measuring the rate of flow of said added gas as an indication of the degree of variance of said mixture from a neutrally combustible mixture.

4. The method of ascertaining the relative combustibility of a gas mixture including as constituents a combustible gas and air, comprising supplying a sample of the mixture at a given volumetric rate of flow to a burner having means associated therewith adapted to indicate when an oxidizing condition of combustion occurs, burning said mixture and adding to the burning mixture at a regulated volumetric rate of flow a supplemental amount of the one of said constituents which will establish a condition bordering an oxidizing condition, fixing the volumetric flow rate of the added constituent at a value which will maintain the condition of combustibility bordering an oxidizing condition, and measuring the rate of flow of said added constituent as a proportion of the rate of flow of the supplied sample to indicate the degree of variance of said mixture from an oxidizing mixture.

5. The method of ascertaining the relative combustibility of a gas mixture including as constituents a combustible gas and air comprising supplying a sample of the mixture at a given volumetric rate to a burner having means associated therewith to indicate when complete combustion of a burning mixture occurs, burning said mixture, adding to the burning mixture a supplemental amount of the one of said constituents which will bring about a condition of complete combustion, adding said supplemental constituent at a regulated volumetric rate just sufficient to establish a condition of complete combustion of the burning gases, fixing the volumetric rate of the supplemental constituent at a value which will substantially maintain the condition of complete combustion, and measuring the volumetric rate of addition of the supplemental constituent as an indication of the degree of variance of said mixture from a completely combustible mixture.

References Cited in the file of this patent

UNITED STATES PATENTS

| Number | Name | Date |
|---|---|---|
| 1,525,406 | Martienssen | Feb. 3, 1925 |
| 2,017,951 | Dasher | Oct. 22, 1935 |
| 2,049,947 | Cope | Aug. 4, 1936 |
| 2,083,521 | Miller | June 8, 1937 |
| 2,332,337 | Norton | Oct. 19, 1943 |
| 2,603,085 | Cannon | July 15, 1952 |
| 2,622,967 | Lobosco | Dec. 23, 1952 |